US007671924B2

(12) United States Patent
Chao et al.

(10) Patent No.: US 7,671,924 B2
(45) Date of Patent: Mar. 2, 2010

(54) METHOD AND DEVICE FOR SCALING A TWO-DIMENSIONAL IMAGE

(75) Inventors: Kun-Yuan Chao, Kaohsiung Hsien (TW); Zhi-Ming Lu, Chlayi County (TW); Chang-Shen Chen, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1033 days.

(21) Appl. No.: 11/045,299

(22) Filed: Jan. 31, 2005

(65) Prior Publication Data

US 2006/0170710 A1 Aug. 3, 2006

(51) Int. Cl.
*H04N 7/01* (2006.01)

(52) U.S. Cl. ....................... 348/581; 348/441; 348/458; 348/558

(58) Field of Classification Search ................. 348/581, 348/441, 443, 445, 448, 453–454, 457–458, 348/578, 558

See application file for complete search history.

(56) References Cited

U.S. PATENT DOCUMENTS

| | | | | |
|---|---|---|---|---|
| 5,739,867 | A | 4/1998 | Eglit | |
| 5,905,536 | A * | 5/1999 | Morton et al. | 348/441 |
| 6,094,226 | A * | 7/2000 | Ke et al. | 348/446 |
| 6,441,857 | B1 * | 8/2002 | Wicker et al. | 348/441 |
| 6,765,563 | B2 * | 7/2004 | Eglit et al. | 345/213 |
| 7,359,007 | B2 * | 4/2008 | Wu | 348/581 |

* cited by examiner

*Primary Examiner*—Trang U Tran
(74) *Attorney, Agent, or Firm*—Finnegan, Henderson, Farabow, Garrett & Dunner, LLP

(57) ABSTRACT

A scaling device for video displays includes a limited number of line buffers and produces stable output frames by using a stable clock source to produce the output image clock. The scaling device further includes an error counter for determining an error between an ideal output line length and an actual line length and an error accumulator for keeping a running total of all output line length errors. The error accumulator can signal when the total line error for a given frame is greater than one, indicating that an additional output point should be added to the blanking area of that output line.

17 Claims, 5 Drawing Sheets

METHOD AND DEVICE FOR SCALING A TWO-DIMENSIONAL IMAGE

BACKGROUND OF THE INVENTION

1. Field of the Invention

Generally, the present invention relates to video display systems. More specifically, the present invention relates to systems and methods for scaling a two-dimensional (2D) video image.

2. Description of the Related Art

Video display devices, such as cathode ray tubes (CRTs), plasma monitors, liquid crystal displays (LCDS) and liquid crystal on silicon (LCoS) displays, typically require a scaling function to perform properly. The scaling function enables the source video images, or frames, of a fixed size and/or aspect ratio to be shown and viewed on a particular display device with a different size and/or aspect ratio. Thus, the scaling function can scale the resolution of the source image to match the resolution used by the display device. Scaling can be accomplished in either the horizontal or vertical dimensions, or both, and can be either upscaling or downscaling, or both.

FIG. 1 illustrates a typical scaling function. As shown in FIG. 1, an input image and associated blanking areas 110 can be enlarged using an upscaling function 120 to an output image 130 appropriate for a particular display device. As used herein, each of the input image and output image can be deconstructed into a number of input lines, each input line including a number of data points. While not meant as a limiting definition for the invention, the input lines are typically horizontal lines that are aligned lengthwise in a vertical direction. The total number of vertical lines, or rows, can be referred to as the vertical resolution. The horizontal points in each line can include picture element, or pixel, data for displaying on a video display device. The horizontal points can also include blanking area information as is generally known in the art.

In the typical scaling device, the pixel data of the source image is received at an input clock rate of the source image, while that of the resulting display image is produced at an output clock rate. Modern scalers use the input clock of the source image as the clock source for a phase lock loop (PLL) to generate the output clock for the display image. This ensures that the input frame rate is equal to the output frame rate. By making the output clock directly related to the input clock, the typical scaler is able to work with just a few line buffers instead of using a larger memory, such as a frame buffer. However, the output clock of the typical scaling device can deviate from the desired display frequency due to inaccuracies of the PLL (i.e., the output clock is not in perfect proportion to the input clock). Such output clock deviation can cause the limited number of line buffers to be insufficient to ensure correct action of the scaler, resulting in incorrect image output.

Additionally, if the PLL uses the input clock to generate the output clock, the output clock must change with the input clock. Generally, the input clock can be unstable under certain operating states of the video display device, such as, fast forward, fast rewind, slow motion, and so on. In this case, the input clock can have a very large variance, which the output clock would duplicate. This unstable, large variance output clock can produce unstable horizontal and vertical sync signals (HS, VS), which can cause the video display device to produce unstable frames or be completely unable to deliver a frame at all.

FIG. 2 illustrates a typical video display scaling device. This typical video display scaling device includes a line buffer block 210 that receives the input data and sync signals. The input clock, ICLK, used with the input data and sync signals is provided to a phase lock loop (PLL) 220. PLL 220 provides an output clock, OCLK, for use by the remainder of the scaling device. The output of line buffer block 210 is coupled to the input of a FIFO block 230. The output of FIFO block 230 is coupled to an interpolator line buffer block 240 and to a scaler block 250. The output of interpolator line buffer block 240 is also coupled to scaler block 250. The output of scaler block 250 is the output data and sync signals.

As shown in FIG. 2, the source data input clock, ICLK, is used by PLL 220 to generate the output clock, OCLK. Thus, in the typical video scaling device, the input data rate must be equal to the output data rate. This equality can be represented by the following equation.

$$H\text{total\_}i \times V\text{total\_}i \times I\text{CLK} = H\text{total\_}o \times V\text{total\_}o \times O\text{CLK} \quad (1)$$

In equation (1): Htotal_i represents the total horizontal points of the input image (including effective points and blank points); Vtotal_i represents the vertical resolution of the input image; Htotal_o represents the total horizontal points of the output image (including effective points and blank points); and Vtotal_o represents the vertical resolution of the output image.

To establish equation (1) (i.e., input data rate=output data rate), the ratio of the output clock to the input clock must satisfy the following equation.

$$O\text{CLK} = (H\text{total\_}i \times V\text{total\_}i \times I\text{CLK}) / (H\text{total\_}o \times V\text{total\_}o) \quad (2)$$

At the required ratio of equation (2), the output frame rate is equal to the input frame rate at any given time. Each frame rate can then be defined by the following equations.

$$\text{Output frame rate} = 1/(H\text{total\_}o \times V\text{total\_}o \times O\text{CLK}) \quad (3)$$

$$\text{Input frame rate} = 1/(H\text{total\_}i \times V\text{total\_}i \times I\text{CLK}) \quad (4)$$

Due to inaccuracies of PLL 220, however, the output clock will deviate from the targeted, or ideal, output frequency; that is, a perfect ratio of the input clock to the output clock cannot be obtained. Such output clock deviation will cause the line buffers 210 to become unable to ensure correct action of the scaler; hence, incorrect video output will result.

For the scaling device of FIG. 1, consider the example of scaling up a 640×480 (i.e., horizontal line length×vertical number of lines) input image to a 960×720 output image. For equation (1) to be satisfied, the time it takes to write 480 input lines must be the same as that to read 720 output lines; or more simply put, the time required to write 2 input lines must be the same as that required to read 3 output lines. Assuming the upscaling adopts a bi-linear algorithm (i.e., that each output line is obtained by inputting two lines) and a single port SRAM is used, the scaling device of FIG. 1 needs at least 4 line buffers to allow the scaler to work properly.

However, as previously mentioned, if equation (1) is not satisfied due to inaccuracy of the PLL, then the time required to write 2 input lines will not equal that required to read 3 output lines. This situation can be illustrated by the following equations.

$$O\text{CLK} \neq (H\text{total\_}i \times V\text{total\_}i \times I\text{CLK}) / (H\text{total\_}o \times V\text{total\_}o) \quad (5)$$

$$O\text{CLK} = (H\text{total\_}i \times V\text{total\_}i \times I\text{CLK}) / (H\text{total\_}o \times V\text{total\_}o) + (t') \quad (6)$$

As shown by equations 5 and 6, t' represents an increment of time by which the input frame is different from the output frame and may have either a positive or negative value. If t' is positive, the time required to read 3 output lines is longer than the time to write 2 input lines (i.e., the rate at which 2 input lines are written is higher than the rate at which 3 output lines are read). The discrepancy adds up until an input line is written into a line buffer without the previous data of that line buffer having been read; that is, an unread input line is overwritten. This will result in an incorrect output image. If t' is negative, the time required to write 2 input lines is longer than the time to read 3 input lines (i.e., the rate at which 3 output lines are read is higher than the rate at which 2 input lines are written). In this case, as t' additively becomes more negative, an output line will eventually read old, duplicative data from a line buffer before a new input line can be written into that line buffer, resulting in inaccurate data reading.

An additional deficiency of the typical scaling device that uses the source image input clock to generate the output clock is that the output clock must change with the input clock. Typically, under certain scaling conditions (e.g., fast forward, fast rewind, or slow motion from a video display device), the input clock can have a very large variation and can become unstable. At that time, the output clock follows the input clock and can generate unstable horizontal and vertical sync signals to the output frame. In this case, the two signals can have a high variation and cause the display device, such as a CRT, to produce unstable frames, or be unable to deliver images at all.

Therefore, what is needed is a scaling device for video displays that produces stable output frames using a limited number of line buffers without the PLL inaccuracies associated with the typical scaling device.

SUMMARY OF THE INVENTION

According to embodiments of the present invention, a circuit for scaling an input image generates an output image. The input image can include a plurality of input lines, with each of the plurality of input lines including a plurality of input points. The output image can include a plurality of output lines, each of the plurality of output lines including a plurality of output points. The scaling circuit can further include: a line buffer that can be used for receiving the plurality of input points at a source frame rate using an input clock signal; a phase lock loop for generating an output clock signal from a source clock signal; an error correction circuit coupled to the line buffer and the phase lock loop for calculating and accumulating an error associated with each of the plurality of output lines and for including a set number additional output points with at least one of the plurality of output lines based on the accumulated error; an output sync generator coupled to the phase lock loop and the error correction circuit for synchronizing the plurality of output points representative of the output image frame using the output clock signal; and a scaler coupled to the line buffer and the output sync generator for scaling the input image frame to generate the plurality of output points representative of the output image frame.

According to some embodiments of the present invention, a method for scaling an input image frame can generate an output image frame. The input image frame can include a plurality of input lines, with each of the plurality of input lines including a plurality of input points. The output image frame can include a plurality of output lines, each of the plurality of output lines including a plurality of output points. The method can further include: receiving the plurality of input points included in the input image frame using a first clock signal; generating an output clock signal using a second clock signal; scaling the input image frame to generate the plurality of output points representative of the output image frame; performing error correction relative to the plurality of output lines; and providing the plurality of output points representative of the output image frame using the output clock signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE INVENTION

The invention will now be described in detail with reference to the drawings, which are provided as illustrative examples of the invention to help enable those skilled in the art to practice the invention. Notably, the figures and examples below are not intended to limit the scope of the invention. Where appropriate, the same reference numbers, in conjunction with the drawings, will be used throughout the detailed description to refer to the same or like parts.

First, to avoid creating an unstable output clock under certain video conditions (e.g., fast forward, fast rewind, slow motion, etc.), a PLL of certain embodiments of the present invention does not directly use the input data clock, ICLK, to generate the output clock, OCLK. Instead, the PLL can use a stable clock, such as a separate crystal clock, RCLK, as an input for generating OCLK. In this manner, embodiments of the present invention can produce an OCLK that will not change with the input clock and can produce stable sync signals (HS, VS). As the crystal clock can work reliably to give a virtually constant input, stable output frames can be produced while continuing to use a minimum number of line buffers.

The following detailed disclosure teaches examples of how to overcome PLL inaccuracies and ensure that a scaler can work correctly with a limited number of line buffers. The number of line buffers according to embodiments of the invention is dependent on the scaling algorithm used in the scaler. For example: using a "Bilinear" method only requires two line buffers; using a "Hermite" or "B-Spline" method only requires four. The number of line buffers needed in other scaler designs is also dependent on the scaling algorithm. Each of these scaler designs is intended to be within the scope of embodiments of the invention.

Figure 1:
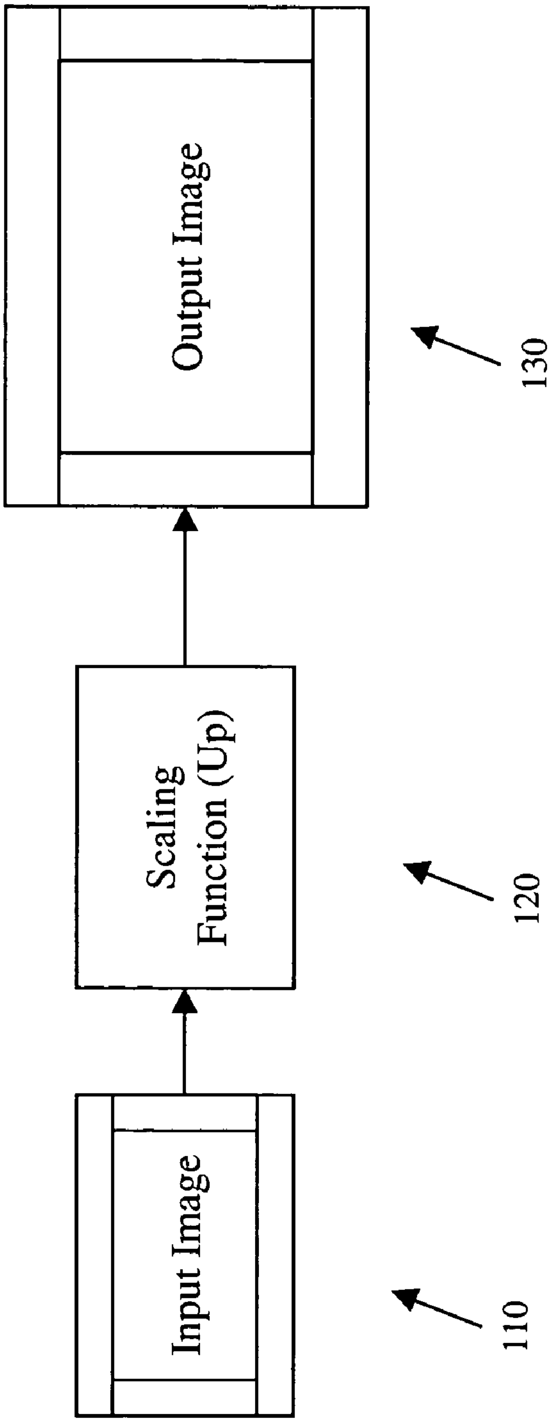
Figure 1 (Prior Art)
FIG. 1 illustrates a typical scaling function.
Figure 2:
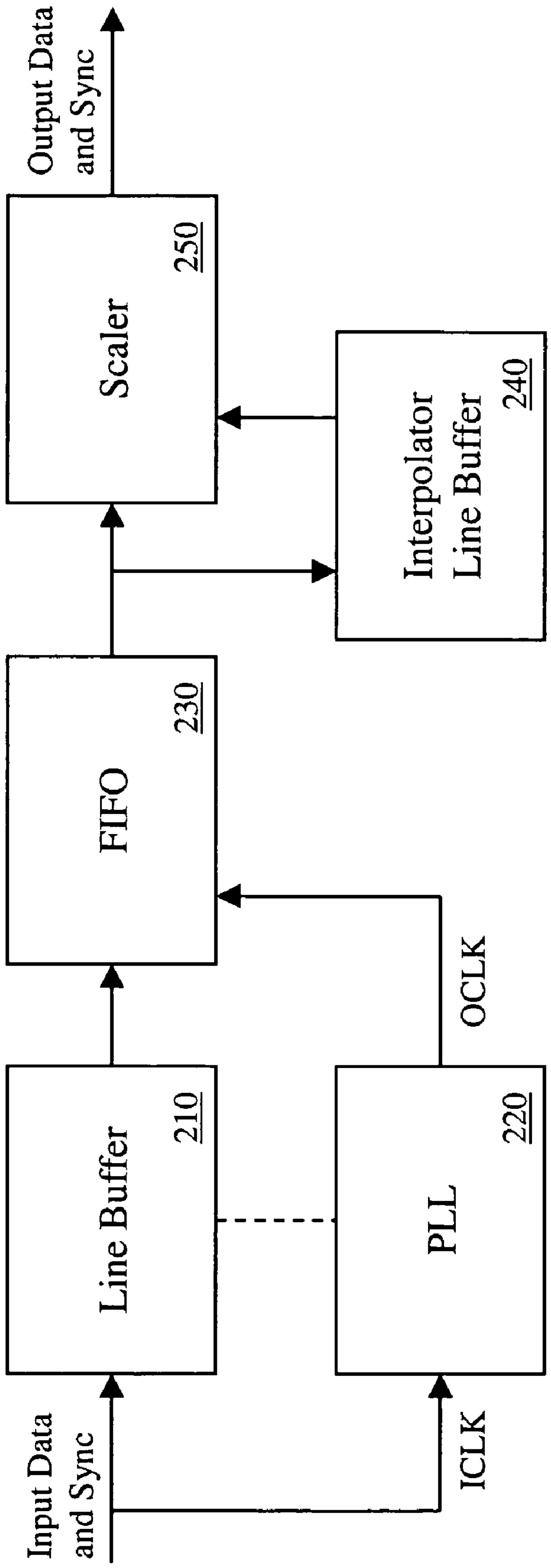
Figure 2 (Prior Art)
FIG. 2 illustrates a typical video display scaling device.
Figure 3:
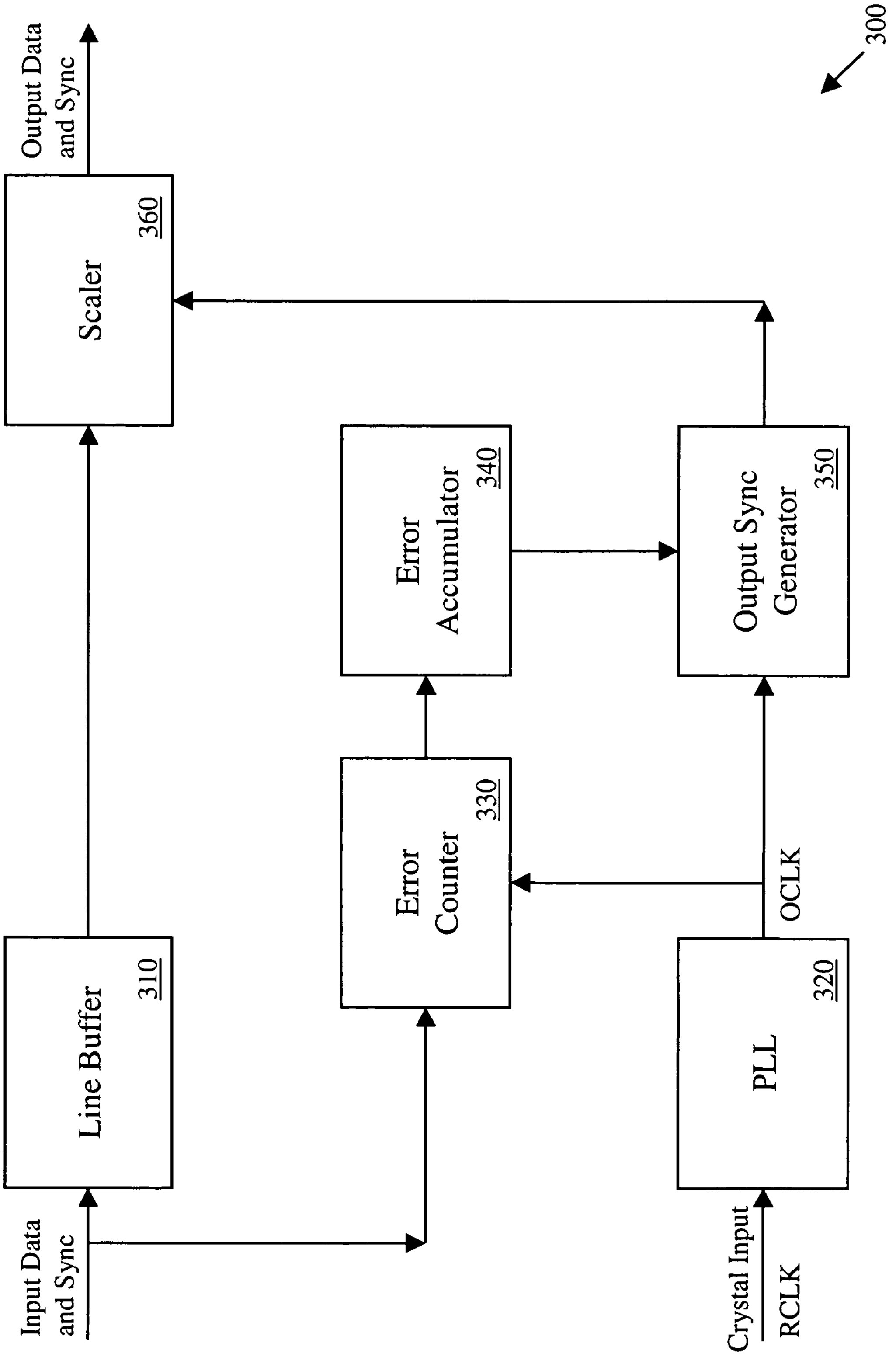
FIG. 3 illustrates a block diagram of a two-dimensional, video scaling device consistent with embodiments of the invention.

FIG. 3 illustrates a block diagram of a two-dimensional, video scaling device 300 according to embodiments of the invention. As shown in FIG. 3, device 300 can include a line buffer block 310 that receives input frame data at an input clock rate, ICLK. A scaler 360, which can include a horizontal and vertical scaling function, receives input frame data from the output of line buffer block 310 at the ICLK rate. However, the output frame data from scaler 360 is produced at a rate based on an output clock. A PLL 320 can receive a stable clock, such as crystal clock, RCLK, as its input and can output the output clock, OCLK, for use within device 300. Thus, the process of generating OCLK according to embodiments of the invention need not use ICLK as an input of PLL 320.

The input data and sync signals can also be coupled to the input of an error counter 330, which can be used to count the incremental error produced by each output line (discussed in further detail, below). This incremental error can then be transmitted to an error accumulator 340, which, as its name implies, accumulates, or combines, the incremental output line errors. Error accumulator 340 can inform an output sync generator 350 when a cumulative error has occurred. For example, as will be further explained below, assuming each incremental error is a fraction between 0 and 1, error accumulator 340 can signal output sync generator 350 to add one horizontal point to the total horizontal points of a particular output line whenever the error accumulator combined error value exceeds 1 for that output line. Error accumulator 340 can then decrease its cumulative error value by 1, reflecting that the extra one horizontal point was added.

Output sync generator 350 can also be used to produce the horizontal sync and vertical sync signals for scaler 360 to use in reading the output image. According to embodiments of the invention, scaler 360 can determine the number of active, or effective, points in an output line (as contrasted to points in one or more blanking areas). Output sync generator 350 can further notify scaler 360 of the total number of points in an output line before scaler 360 outputs that line. For example, when error accumulator 340 has a cumulative error value larger than one, it can notify output sync generator 350 to add one into the number of points of one of the blanking areas in an output line. Then output sync generator 350 can evaluate the total number of points in the output line via the numbers of active points and the points in the blanking area. Of course, the one or more blanking areas in a line outputted by scaler 360 also include H sync signals, blank signals, and so on. The extra error correction point in this example can be added to the blanking signals.

Aspects of the invention can use independent crystal clock, RCLK, as the input to PLL 320, instead of the unstable data input clock of the source video, in an attempt to obtain an ideal output clock for use by scaling device 300. The frequency magnification of PLL 320 (i.e., OCLK/RCLK) can then be set using the following relationship, which can be derived using equation (2):

$$(H\text{total\_}i\times V\text{total\_}i\times I\text{CLK})/(H\text{total\_}o\times V\text{total\_}o\times R\text{CLK}) \tag{7}$$

For example, assuming the OCLK/RCLK ratio for PLL 320 is 4/9 (i.e., 0.444444 . . . ) and further assuming PLL 320 uses 8 bits to hold this value, the actual frequency magnification of PLL 320 would be the nearest 8-bit, discrete value to 4/9. In this example, the actual frequency magnification would be 114/256 (i.e., 0.4453125). Alternatively, the actual frequency magnification could be 113/256 (i.e., 0.44140625), if the nearest, smaller discrete value to 4/9 were chosen.

If the accuracy of PLL 300 were unlimited (which it is not, as discussed below), the OCLK at the output of PLL 320 would be as follows:

$$O\text{CLK}=(H\text{total\_}i\times V\text{total\_}i\times I\text{CLK})/(H\text{total\_}o\times V\text{total\_}o) \tag{8}$$

With such an ideal OCLK, the total number of horizontal points, or picture elements (i.e., pixels), that each output line will have will be the integer value, Htotal_o, as follows:

$$H\text{total\_}o=(H\text{total\_}i\times V\text{total\_}i\times I\text{CLK})/(O\text{CLK}\times V\text{total\_}o) \tag{9}$$

However, as previously discussed, the accuracy of PLL 320 is not unlimited. So, the realistic OCLK at the output of PLL 220 will be as follows:

$$O\text{CLK}=(H\text{total\_}i\times V\text{total\_}i\times I\text{CLK})/(H\text{total\_}o\times V\text{total\_}o)+\Delta t \tag{10}$$

where Δt is some error introduced by inaccuracies in PLL 320. The time required for reading an output frame (i.e., Htotal_o×Vtotal_o×OCLK) is given by the following equations:

$$=H\text{total\_}o\times V\text{total\_}o\times((H\text{total\_}i\times V\text{total\_}i\times I\text{CLK})/(H\text{total\_}o\times V\text{total\_}o)+\Delta t) \tag{11}$$

$$=(H\text{total\_}i\times V\text{total\_}i\times I\text{CLK})+(H\text{total\_}o\times V\text{total\_}o\times\Delta t) \tag{12}$$

In equations (11) and (12): (Htotal_i×Vtotal_i×ICLK) is the time required for writing an input frame; and (Htotal_o×Vtotal_o×Δt) is the time difference between writing an input frame and reading an output frame. Of the time differential between writing an input frame and reading an output frame, (Htotal_o×Δt) is the time difference between each output line and an ideal output line (i.e., the time of an ideal output line is the time of each output line when Δt=0, and is a positive or negative number with an absolute value of less than 1).

Figure 4:
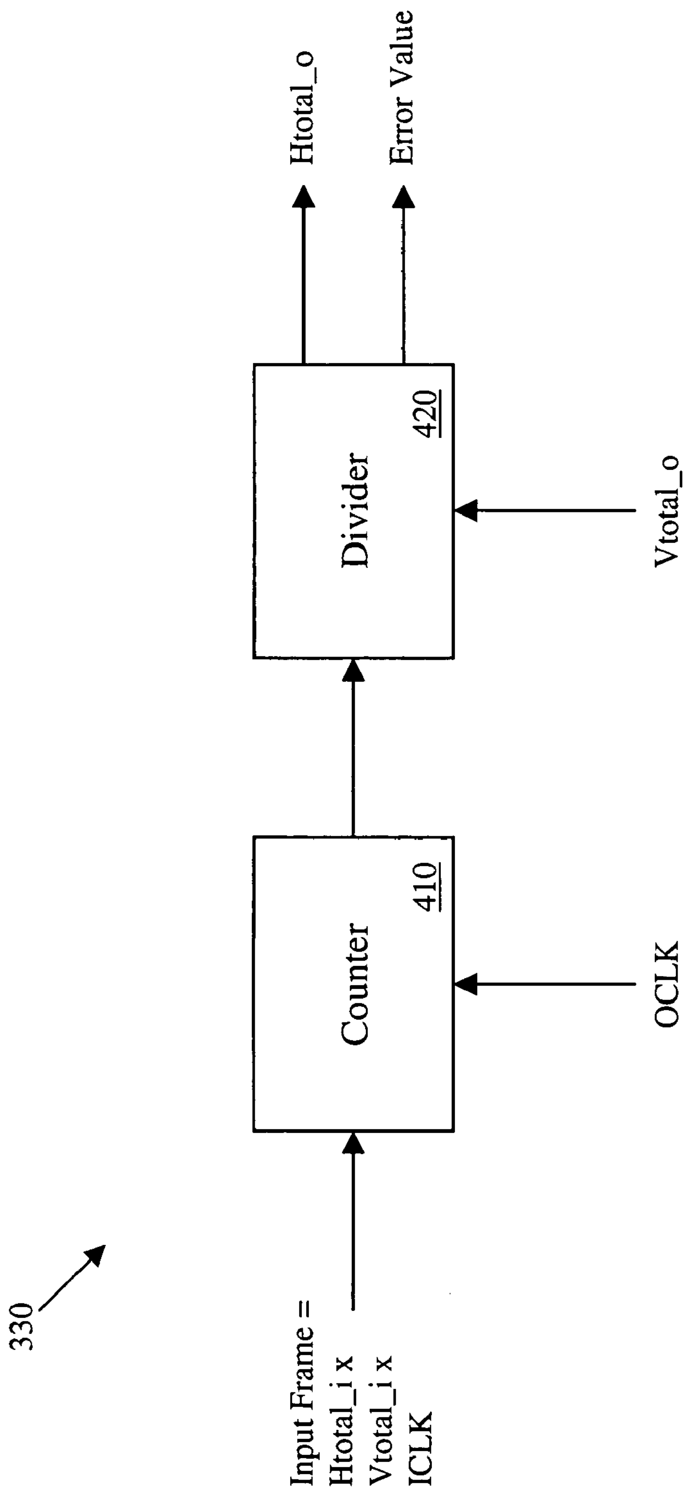
FIG. 4 illustrates an error counter consistent with embodiments of the present invention.

FIG. 4 illustrates error counter 330 according to embodiments of the present invention. Error counter 330 can include two major components: a counter 410 and a divider 420. Counter 410 receives the input frame data and OCLK as inputs. The output of counter 410 is coupled to an input of divider 420. Divider 420 also receives the total vertical resolution as an input. Divider 420 outputs the total horizontal resolution and an error value.

In operation, counter 410 calculates the number of total OCLK cycles in one input frame. This calculation uses the following relationship:

$$(H\text{total\_}i\times V\text{total\_}i\times I\text{CLK})/O\text{CLK} \tag{13}$$

The resultant of this calculation is then passed to divider 420. Divider 420 takes this resultant value from counter 410 and divides it by the total number of vertical lines in the output image (i.e., the total vertical resolution, Vtotal_o). The resultant of the divider 420 calculation is a value that represents the total number of points of each output line (i.e., Htotal_o), along with a remainder. The quotient obtained by dividing this divider 420 remainder value by the total number of lines in the output frame (i.e., Vtotal_o) is the error of each output line from an ideal output line (i.e., Error Value).

Figure 5:
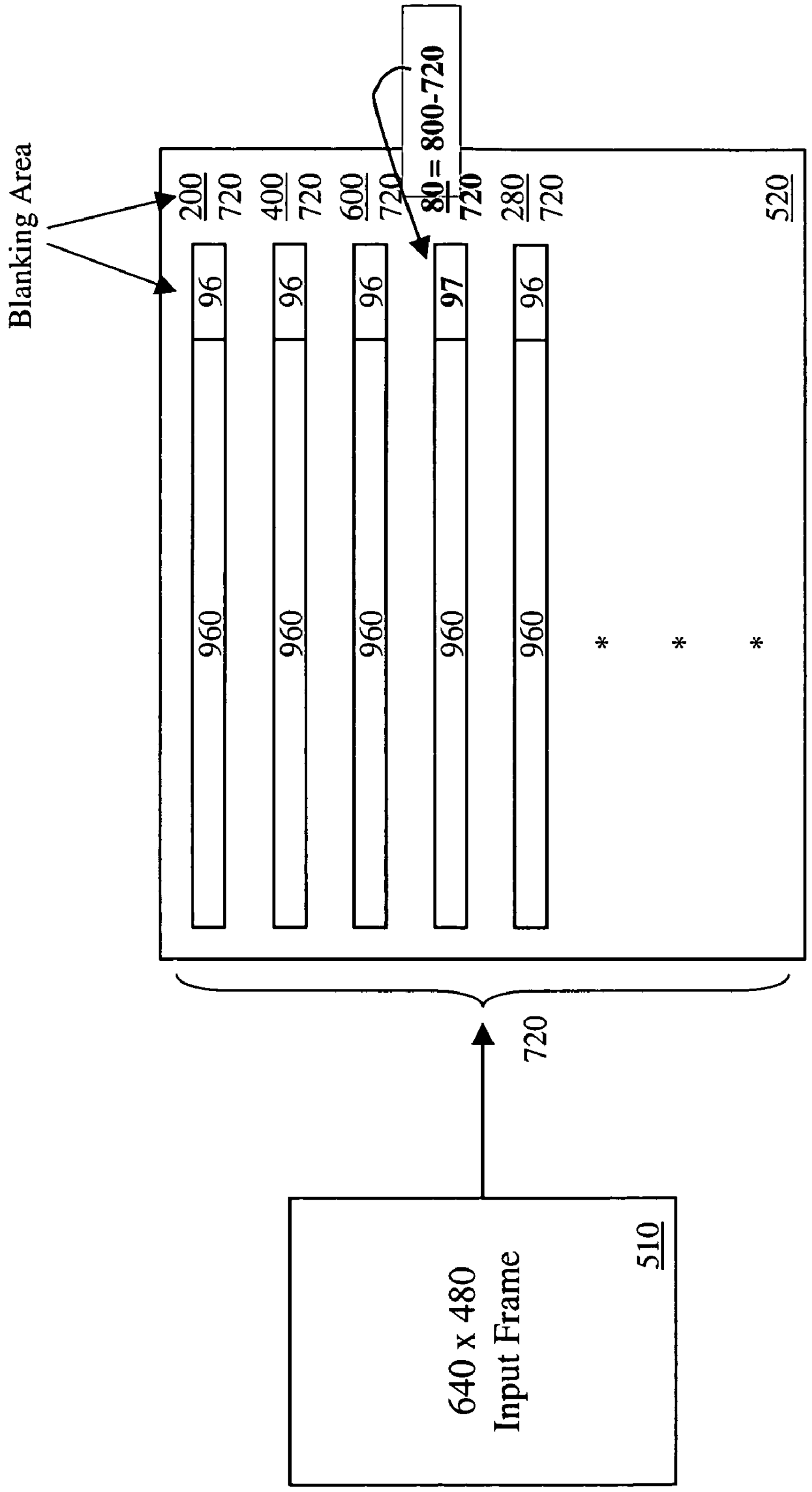
FIG. 5 illustrates an example of scaling up an input image from 640×480 to 960×720 consistent with embodiments of the present invention.

FIG. 5 illustrates an example of scaling up an input image from a 640×480 input frame 510 to a 960×720 output frame 520 according to embodiments of the present invention. For this example, it is assumed that the total number of OCLK cycles per one input frame is 760520. This total OCLK number would, for example, result from the calculation of counter 410, as discussed above. Since the number of output lines is 720 (i.e., the output vertical resolution), divider 420 would calculate 760520 divided by 720 to get a value of 1056 and a remainder of 200, where 1056 is the total number of points of each output line, including 960 effective points and 96 points in one or more blanking areas. The remainder of 200 means the time of one input frame is 200 OCLK cycles longer than that of one output frame. Dividing this remainder by the number of output lines (i.e., 200/720) yields the error of each output line from an ideal output line.

According to additional aspects of the invention (and referring again to FIG. 3), the output of error counter 330 is coupled to the input of error accumulator 340. In operation, error accumulator 340 can be incremented by the error of each output line from the ideal output line (i.e., by Htotal_o×Δt) whenever an output line is added for display. Error accumulator 340 can keep a running total of these incremental line errors and can, for example, increase the number of points in a line by one when the cumulative error exceeds one. Once this error correction point is added to an output line, error accumulator 340 can decrement the error running total by one. It is noted that the threshold set number of error accumulator 340 can be any suitable value and unit, such as, one pixel, two pixels, one OCLK, two OCLKs, and the like. Those skilled in the art will recognize that all values and units of the threshold set number of error accumulator 340 mentioned thus far are examples only and are not intended to limit the scope of the invention.

To illustrate, it is assumed (Htotal_o×Δt) is a positive number. In this case, whenever the value of the accumulator is greater than 1, the total pixels of that output line will increase by 1 (i.e., Htotal_o+1) and the value of the accumulator will decrease by 1. In this way, embodiments consistent with the present invention can limit the time difference between writing a frame and reading a frame to less than the time of one output clock cycle. The remaining, less significant error of the accumulator after adjustment will be added to the subsequent errors and be used to adjust subsequent output lines when the accumulated error next exceeds 1 again.

In the above example, which is represented in FIG. 5, the number of total points of each output line is originally calculated at 1056 (i.e., the non-error corrected number). The first (or top) output line of output frame 520 includes 1056 points with a remainder of 200/720. The accumulated error value is therefore 200/720. The second and third lines down from the top are also 1056 points in length with remainders of 200/720. Thus, after the third output line, the accumulated error value is up to 600/720 (i.e., 200/720 added for each of the first three output lines). At output line four, the basic (i.e., non-error corrected) output line length is still 1056. However, an additional 200/720 error value accumulated with the previous 600/720 cumulative error equals a value greater than one, or 800/720. Because the cumulative error value would be greater than one if the fourth output line length was kept at 1056, one additional output point is added to a blanking area of output line four and the accumulated error value is decremented by one. Therefore, output line four will include an error-adjusted 1057 output points (960 effective point and 97 blanking area points) and the accumulated error value will be less than one again, or 80/720. Such adjustment can ensure that the difference in time between writing one input frame and reading one output frame is less than one OCLK (i.e., the output frame rate will not equal the input frame rate).

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of scaling an input image frame to generate an output image frame, the input image frame including a plurality of input lines, with each of the plurality of input lines including a plurality of input points, and the output image frame including a plurality of output lines, each of the plurality of output lines including a plurality of output points, the method comprising:

receiving the plurality of input points included in the input image frame using a first clock signal;

generating an output clock signal using a second clock signal;

scaling the input image frame to generate the plurality of output points representative of the output image frame;

performing error correction relative to the plurality of output lines; and providing the plurality of output points representative of the output image frame using the output clock signal; wherein:

the first clock signal and the second clock signal are mutually independent;

the first clock signal and the output clock signal are mutually independent;

the second clock signal and the output clock signal are different signals; and the performing error correction includes:

calculating an error associated with each of the plurality of output lines;

accumulating the error from each of the plurality of output lines; and including a set number of additional output points with at least one of the plurality of output lines based on the accumulated error.

2. The method of claim 1, wherein:

the receiving includes writing the plurality of input points into a line buffer using the first clock signal; and the providing includes reading the plurality of input points out of the line buffer using the output clock signal.

3. The method of claim 1, wherein the second clock signal is a crystal clock signal.

4. The method of claim 1, wherein the input image frame has a first aspect ratio and the output image frame has a second aspect ratio, wherein the first aspect ratio is not equal to the second aspect ratio.

5. The method of claim 4, wherein the number of lines in the plurality of output lines is not equal to the number of lines in the plurality of input lines.

6. The method of claim 2, wherein the line buffer comprises memory sufficient to store at least two of the plurality of input lines.

7. The method of claim 1, wherein the calculating includes:

dividing an input image frame length by the output clock signal to produce a total number of output clock cycles per input image frame; and dividing the total number of output clock cycles per input image frame by a vertical resolution total number of the plurality of input lines to produce a total number of the plurality of output points and a remainder, wherein the remainder divided by the vertical resolution total equals the error associated with each of the plurality of output lines.

8. The method of claim 7, wherein the set number of additional points are included with the at least one of the plurality of output lines when the accumulated error is greater than or equal to the set number.

9. The method of claim 8, wherein the set number is one.

10. The method of claim 8, wherein the performing error correction further includes:

decreasing the accumulated error by the set number when the set number of additional points are included with the at least one of the plurality of output lines.

11. A circuit of scaling an input image frame to generate an output image frame, the input image frame including a plurality of input lines, with each of the plurality of input lines including a plurality of input points, and the output image frame including a plurality of output lines, each of the plurality of output lines including a plurality of output points, the circuit comprising:

means for receiving the plurality of input points included in the input image frame using a first clock signal;

means for generating an output clock signal using a second clock signal;

means for scaling the input image frame to generate the plurality of output points representative of the output image frame;

means for performing error correction relative to the plurality of output lines; and means for providing the plurality of output points representative of the output image frame using the output clock signal; wherein:

the first clock signal and the second clock signal are mutually independent;

the first clock signal and the output clock signal are mutually independent;

the second clock signal and the output clock signal are different signals; and the means for performing error corrections includes:

means for calculating an error associate with each of the plurality of output lines;

means for accumulating the error from each of the plurality of output lines; and means for including a set number of additional output points with at least one of the plurality of output lines based on the accumulated error.

12. The circuit of claim 11, wherein:

the means for receiving includes means for writing the plurality of input points into a line buffer using the first clock signal; and the means for providing includes means for reading the plurality of input points out of the line buffer using the output clock signal.

13. The circuit of claim 11, wherein the means for calculating includes:

means for dividing an input image frame length by the output clock signal to produce the total number of output clock cycles per input image frame; and means for dividing the total number of output clock cycles per input image frame by a vertical resolution total number of the plurality of input lines to produce a total number of the plurality of output points and a remainder, wherein the remainder divided by the vertical resolution total equals the error associate with each of the plurality of output lines.

14. The circuit of claim 13, wherein the set number of additional points are included with the at least one of the plurality of output lines when the accumulated error is greater than or equal to the set number.

15. The circuit of claim 14, wherein the set number is one.

16. The circuit of claim 14, wherein the means for performing error corrections further includes:

means for decreasing the accumulated error by the set number when the set number of additional points are included with the at least one of the plurality of output lines.

17. A circuit for scaling an input image to generate an output image, the input image including a plurality of input lines, with each of the plurality of input lines including a plurality of input points, the output image including a plurality of output lines, each of the plurality of output lines including a plurality of output points, the circuit comprising:

a line buffer for receiving the plurality of input points at a source frame rate using an input clock signal;

a phase lock loop for generating an output clock signal from a source clock signal;

an error correction circuit coupled to the line buffer and the phase lock loop for calculating and accumulating an error associated with each of the plurality of output lines and for including a set number of additional output points with at least one of the plurality of output lines based on the accumulated error;

an output sync generator coupled to the phase lock loop and the error correction circuit for synchronizing the plurality of output points representative of the output image frame using the output clock signal; and a scaler coupled to the line buffer and the output sync generator for scaling the input image frame to generate the plurality of output points representative of the output image frame.

* * * * *